US010207622B2

(12) United States Patent
Sedmina et al.

(10) Patent No.: US 10,207,622 B2
(45) Date of Patent: Feb. 19, 2019

(54) VEHICLE LOADING DEVICE AND METHOD

(71) Applicants: Thomas Sedmina, Scarborough (CA); Susan Chandra Ojha, Scarborough (CA)

(72) Inventors: Thomas Sedmina, Scarborough (CA); Susan Chandra Ojha, Scarborough (CA)

(*) Notice: Subject to any disclaimer, the term of this patent is extended or adjusted under 35 U.S.C. 154(b) by 0 days.

(21) Appl. No.: 15/638,275

(22) Filed: Jun. 29, 2017

(65) Prior Publication Data

US 2019/0001858 A1 Jan. 3, 2019

(51) Int. Cl.
*B60P 1/52* (2006.01)

(52) U.S. Cl.
CPC ...................... *B60P 1/52* (2013.01)

(58) Field of Classification Search
CPC ..................... B60P 1/52; B60P 1/00
See application file for complete search history.

(56) References Cited

U.S. PATENT DOCUMENTS

| 2,079,790 | A | * | 5/1937 | Colorigh | B60P 1/5428 |
| | | | | | 193/37 |
| 3,870,178 | A | * | 3/1975 | Ellen | B60P 1/52 |
| | | | | | 414/462 |
| 3,900,118 | A | * | 8/1975 | Kellogg | B62D 33/0273 |
| | | | | | 193/37 |
| 3,961,715 | A | * | 6/1976 | Ellen | B60P 1/52 |
| | | | | | 296/16 |
| 4,193,729 | A | * | 3/1980 | Winfield | B60P 1/52 |
| | | | | | 414/532 |
| 4,212,581 | A | * | 7/1980 | Pierce | B60P 1/00 |
| | | | | | 193/37 |
| 5,915,911 | A | | 6/1999 | Hodgetts | |
| 6,467,662 | B1 | * | 10/2002 | LaRochelle | B60P 1/52 |
| | | | | | 224/310 |

FOREIGN PATENT DOCUMENTS

EP 0838372 3/2002

* cited by examiner

*Primary Examiner* — Kaitlin S Joerger
(74) *Attorney, Agent, or Firm* — Integrity Patent Group, PLC; Charles E. Runyan (57) ABSTRACT

A loading apparatus includes a first roller, a second roller, a first arm support, a second arm support, a support bar, a first clamp and a second clamp. The loading apparatus is useful for providing a loading apparatus to facilitate loading an article into and out of a vehicle.

20 Claims, 5 Drawing Sheets

VEHICLE LOADING DEVICE AND METHOD

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

FIELD OF THE INVENTION

The present invention relates generally to the field of loading means and more specifically relates to a removable loading apparatus including two rollers and which is attachable to a vehicle.

DESCRIPTION OF RELATED ART

The loading and unloading of somewhat heavy structures, such as a large crate or the like, has never been a particularly easy task. Damage both to the bed of the vehicle, particularly near the rear, loading end thereof, and to the structure being loaded or unloaded, has been a frequent occurrence. Further, many vehicles have high ground clearance so that when loading the trunk with items such as luggage, it is necessary to raise these objects high enough to reach the bed of the trunk, which requires a significant and time consuming effort from the person loading the trunk. In addition, unloading the vehicle can be labor intensive, time-consuming and in some cases dangerous. It would therefore be beneficial if the load could be loaded and unloaded quickly and require a fraction of the time and effort now used.

U.S. Pat. No. 4,193,729 to Robert J. Winfield relates to a roller attachment for a vehicle. The described roller attachment for a vehicle includes a plurality of rollers mounted on a base plate. A support assembly having a reinforcement structure is provided. A clamp assembly joins the roller and support assemblies, the support assembly being pivotally attached to the clamp, the clamp being operable to move the roller and support assemblies toward, or away from, each other.

BRIEF SUMMARY OF THE INVENTION

In view of the foregoing disadvantages inherent in the known loading apparatus art, the present disclosure provides a novel vehicle loading device and method. The general purpose of the present disclosure, which will be described subsequently in greater detail, is to provide a loading apparatus to facilitate loading an article into and out of a vehicle.

A loading apparatus is disclosed herein. The loading apparatus includes a first roller which may include a first distal end and a first proximal end configured to receive a load and roll the load into the rear loading portion of the vehicle, and a second roller which may include a second distal end and a second proximal end configured to receive the load and roll the load into the rear loading portion of the vehicle. Further included may be a first arm support having a first left corner, a first right corner and a first bottom corner, the first left corner being fixedly attached to the first distal end of the first roller; the first right corner being fixedly attached to the second distal end of the second roller and the first arm support being configured to swivel on an axis, and a second arm support which may have a second left corner, a second right corner and a second bottom corner; the second left corner being fixedly attached to the first distal end of the first roller. The second right corner is fixedly attached to the second distal end of the second roller and the first arm support being configured to swivel on the axis.

In addition, the loading apparatus may include a support bar which may include the axis, a first end and a second end; the first end being fixedly attached to the first bottom corner of the first arm support and the second end being fixedly attached to the second bottom corner of the second arm support. Further to this, a first clamp may be fixedly attached to the first bottom corner of the first support arm, the first clamp being configured to removably lock onto the rear threshold of the vehicle, and correspondingly, a second clamp may be fixedly attached to the second bottom corner of the second support arm; the second clamp being configured to removably lock onto the rear threshold of the vehicle.

A method of using a loading apparatus is also disclosed herein. The method of using a loading apparatus may comprise the steps of: providing the loading apparatus (the loading apparatus including a first roller, a second roller, a first arm support, a second arm support, a support bar, a first clamp and a second clamp); securing the first clamp and the second clamp to the rear threshold of the vehicle; placing a load onto the first roller and the second roller; rolling the load over the first roller and the second roller and into the rear loading portion of the vehicle; and unclamping the first clamp and the second clamp from the rear threshold of the vehicle. Further steps may include: folding the loading apparatus into a compact state, and stowing the loading apparatus in the rear loading portion of the vehicle when not in use.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a vehicle loading device and method, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to a loading apparatus and more particularly to a vehicle loading device and method as used to improve the loading apparatus' capability to facilitate loading an article into and out of a vehicle.

Generally speaking, the loading apparatus may help to load any type of vehicle. It may include an easy clip-on two roller system with swivel arms which may help reduce friction between a load and a vehicle threshold. This may further aid in protection of the vehicle as there is a reduced chance of the vehicle being damaged by the load. The loading apparatus may be made from steel rods and further include extendable clamps, and the two roller system may be made from a rubber material. Further, the loading apparatus may be collapsible and weigh no more than 20 lb. In a further embodiment, the loading apparatus may be accompanied by a winch for heavier loads.

Referring now more specifically to the drawings by numerals of reference, there is shown in FIGS. 1-5, various views of a loading apparatus 100.

Figure 1:
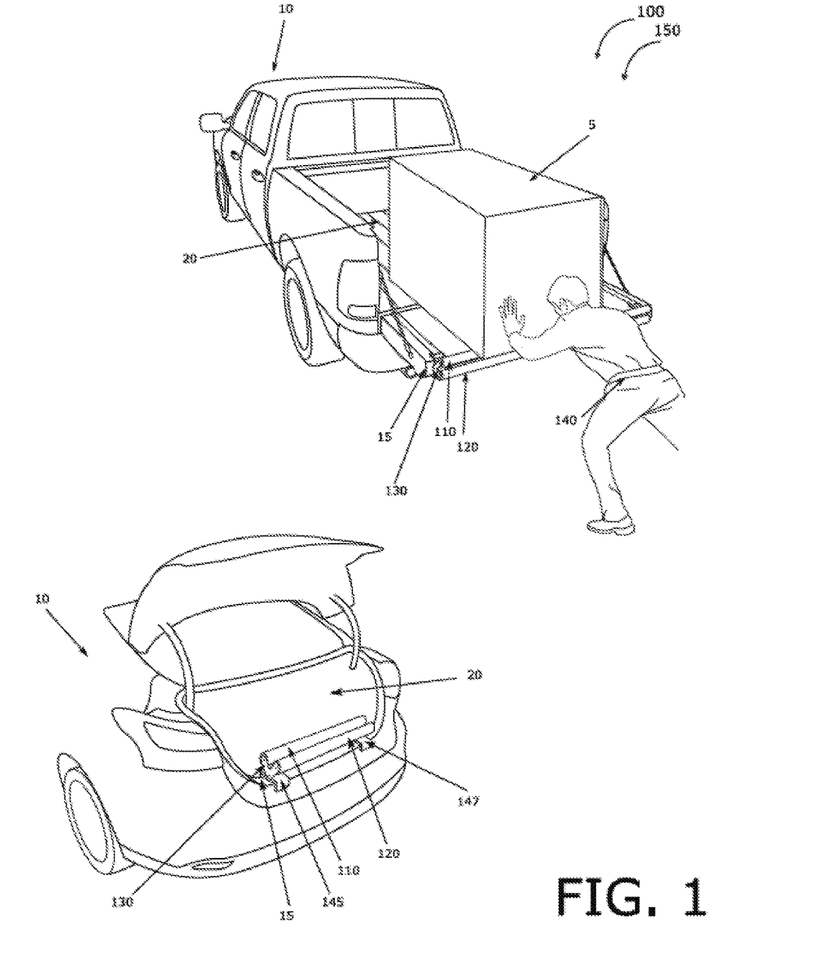
FIG. 1 is a front perspective view of the loading apparatus during an 'in-use' condition, according to an embodiment of the disclosure.

FIG. 1 shows a loading apparatus 100 during an 'in-use' condition 150, according to an embodiment of the present disclosure. As Illustrated, the loading apparatus 100 may include a first roller 110, a second roller 120, a first arm support 130, a second arm support 136, a support bar 202, a first clamp 145 and a second clamp 147. In a preferred embodiment, the loading apparatus 100 may be foldable and configured for compact storage.

Figure 2A:
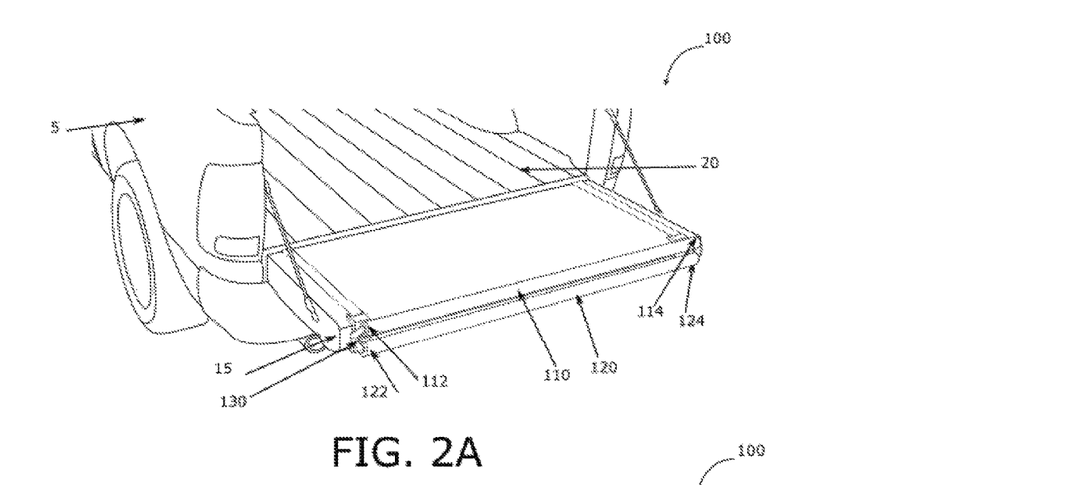
FIG. 2A is a front perspective view of the loading apparatus of FIG. 1 attached to the vehicle according to an embodiment of the present disclosure.

FIG. 2A shows a front perspective view of the loading apparatus 100 of FIG. 1, attached to a vehicle 10 according to an embodiment of the present disclosure. As above, the loading apparatus 100 may include a first roller 110 including a first distal end 112 and a first proximal end 114 configured to receive a load 5 and roll the load 5 into the rear loading portion 20 of the vehicle 10. A second roller 120 including a second distal end 122 and a second proximal end 124 is configured to receive the load 5 and roll the load 5 into the rear loading portion 20 of the vehicle 10. Further included may be a first arm support 130 having a first left corner 131, a first right corner 132 and a first bottom corner 133, the first left corner 131 being fixedly attached to the first distal end 112 of the first roller 110, the first right corner 132 being fixedly attached to the second distal end 122 of the second roller 120, and the first arm support 130 being configured to swivel on an axis 203, and a second arm support 136 having a second left corner 137, a second right corner 138 and a second bottom corner 139; the second left corner 137 being fixedly attached to the first proximal end 114 of the first roller 110, the second right corner 138 being fixedly attached to the second proximal end 124 of the second roller 120 and the first arm support 130 being configured to swivel on the axis 203.

In addition, the loading apparatus 100 may include a support bar 202 including the axis 203, a first end 204 and a second end 205; the first end being fixedly attached to the first bottom corner 133 of the first arm support 130 and the second end being fixedly attached to the second bottom corner 139 of the second arm support 136. Further to this, a first clamp 145 may be fixedly attached to the first bottom corner 133 of the first arm support 130, the first clamp 145 being configured to removably lock onto the rear threshold 15 of the vehicle 10, and correspondingly, a second clamp 147 may be fixedly attached to the second bottom corner 139 of the second arm support 136, the second clamp 147 being configured to removably lock onto the rear threshold 15 of the vehicle 10.

The vehicle 10 may be a pickup truck for example or other such vehicle. In this embodiment, the rear threshold 15 may be a tailgate. In a further example, the vehicle 10 may be a sedan and the rear threshold 15 may be a lip of a trunk of the sedan.

Figure 2B:
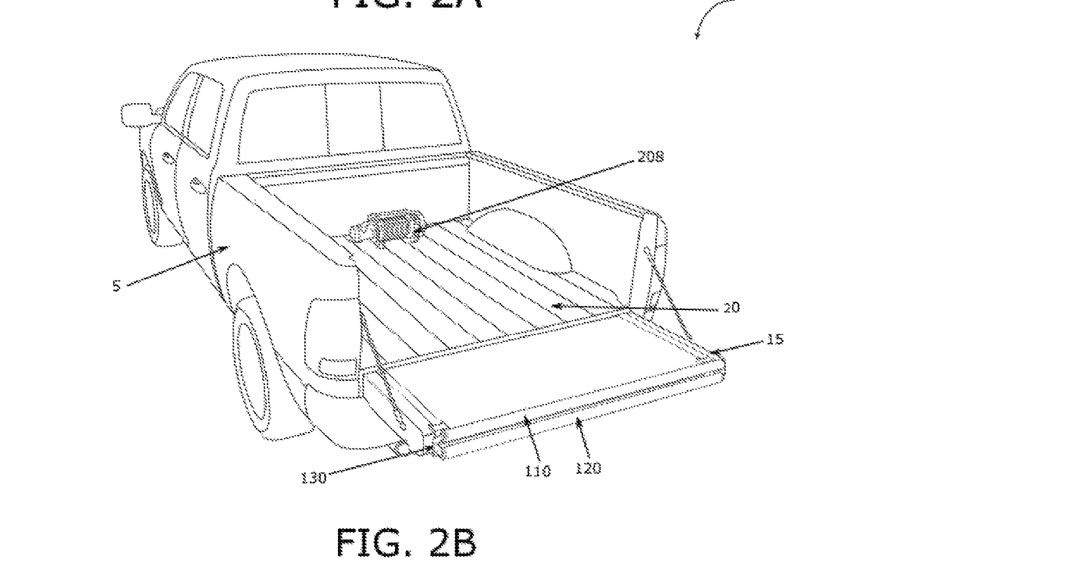
FIG. 2B is a front perspective view of the loading apparatus of FIG. 1, illustrating the loading apparatus and a winch according to an embodiment of the present disclosure.

FIG. 2B shows a front perspective view of the loading apparatus 100 of FIG. 1, illustrating a winch 208 attached to the vehicle 10 to aid in pulling a heavier load 5 into the rear loading portion 20, according to an embodiment of the present disclosure. As above, the loading apparatus 100 may include a first roller 110 including a first distal end 112 and a first proximal end 114, the first roller 110 configured to receive a load 5 and roll the load 5 into the rear loading portion 20 of the vehicle 10, and a second roller 120 including a second distal end 122 and a second proximal end 124; the second roller 120 configured to receive the load 5 and roll the load 5 into the rear loading portion 20 of the vehicle 10. The loading apparatus 100 may further include a winch 208 configured to pull heavy loads into the rear loading portion 20 of the vehicle 10.

Figure 3:
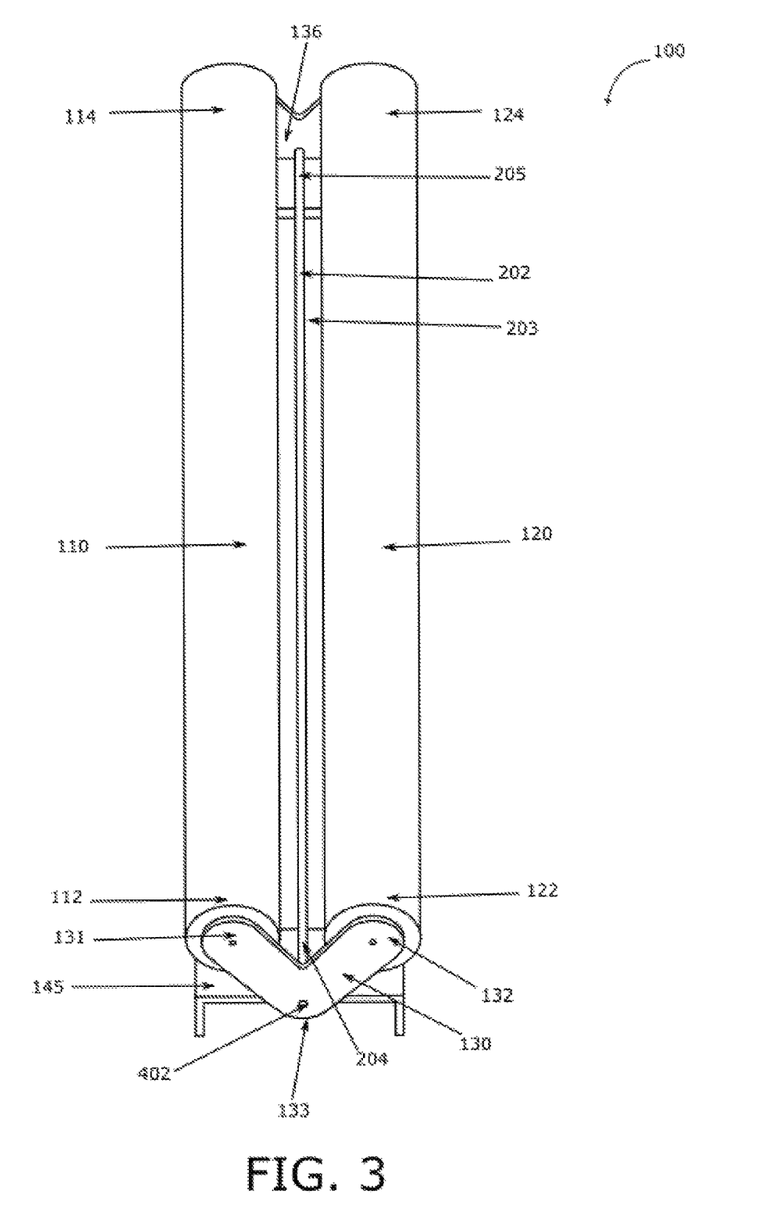
FIG. 3 is a front perspective view of the loading apparatus of FIG. 1, according to an embodiment of the present disclosure.

Referring now to FIG. 3 showing a front perspective view of the loading apparatus 100 of FIG. 1. Illustrated here is the first roller 110 and the second roller 120 of the loading apparatus 100 according to an embodiment of the present disclosure. The first roller 110 and the second roller 120 may be configured in combination to provide a means to roll-load the load 5 into the vehicle 10 with a minimum effort. The first roller 110 and the second roller 120 may be configured to receive and roll a weight of at least 50 lb. In the preferred embodiment, the first roller 110 and the second roller 120 may be composed of a rubberized compound. The rubberized compound may be configured to allow for better grip of the load 5 to prevent slippage. Further, the rubberized compound may be more lightweight than other materials, thus providing the loading apparatus 100 with better movability. In further examples, the first roller 110 and the second roller 120 may be composed from other materials such as metal, plastic, polyurethane, or the like. Further, the first roller 110 and the second roller 120 may include a first smooth surface and a second smooth surface, respectively, configured to prevent friction between the load and the first roller 110 and the second roller 120 when the load 5 is being loaded into the rear loading portion 20 of the vehicle 10. This will also further aid in rolling of the load 5 into the rear loading portion 20 of the vehicle 10.

Figure 4A:
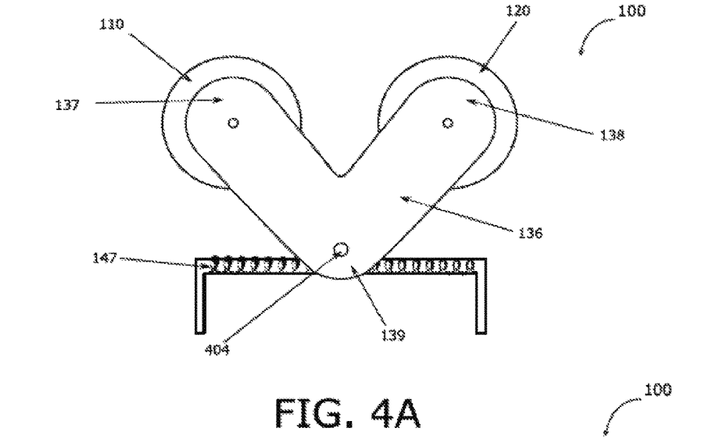
FIG. 4A is a side perspective view of the loading apparatus of FIG. 1, according to an embodiment of the present disclosure.

FIG. 4A shows a front perspective view of the loading apparatus 100 of FIG. 1, illustrating the first arm support 130 and the first clamp 145 according to an embodiment of the present disclosure. As above, the loading apparatus 100 may include a first arm support 130 having a first left corner 131, a first right corner 132 and a first bottom corner 133, the first left corner 131 being fixedly attached to the first distal end 112 of the first roller 110, the first right corner 132 being fixedly attached to the second distal end 122 of the second roller 120, and the first arm support 130 being configured to swivel on an axis 203, and a second arm support 136 having a second left corner 137, a second right corner 138 and a second bottom corner 139, the second left corner 137 being fixedly attached to the first proximal end 114 of the first roller 110, the second right corner 138 being fixedly attached to the second proximal end 124 of the second roller 120, and the first arm support 130 being configured to swivel on the axis 203. Further, a support bar 202 including the axis 203, a first end 204 and a second end 205, the first end being fixedly attached to the first bottom corner 133 of the first arm support 130, the second end being fixedly attached to the second bottom corner 139 of the second arm support 136.

A first clamp 145 may be fixedly attached to the first bottom corner 133 of the first arm support, the first clamp 145 being configured to removably lock onto the rear threshold 15 of the vehicle 10, and a second clamp 147 may be fixedly attached to the second bottom corner 139 of the second arm support 136, the second clamp 147 being configured to removably lock onto the rear threshold 15 of the vehicle 10. In one embodiment, a first strap may be threaded through the first clamp 145, and a second strap may be threaded through the second clamp 147, and configured to secure around the load 5 to help lift the load 5 into the rear loading portion 20 of the vehicle 10. In the preferred embodiment, the first clamp 145 and the second clamp 147 may be spring-loaded.

The first arm support 130 may be connected to the support bar 202 with a first swivel connector 402, and the second arm support 136 may be connected to the support bar 202 with a second swivel connector 404. The first arm support 130 and the second arm support 136 may be composed of a metal material. Similarly, the first clamp 145 and the second clamp 147 may be composed of a metal material. In the preferred embodiment, the metal material may be steel. In further examples, the metal may be aluminum, titanium, or the like.

The first roller 110 and the second roller 120 may be configured to receive and roll a weight of at least 50 lb. Further, the first clamp 145 and the second clamp 147 may be configured to support the weight of at least 50 lb, and the first arm support 130 and the second arm support 136 may also be configured to support the weight of at least 50 lb. In some embodiments, the first roller 110 and the second roller 120 may be configured to receive and roll a weight of between 50 lb and 500 lb. In this embodiment, the first clamp 145, the second clamp 147, the first arm support 130, and the second arm support 136 may be configured to support the weight of between 50 lb and 500 lb.

Figure 4B:
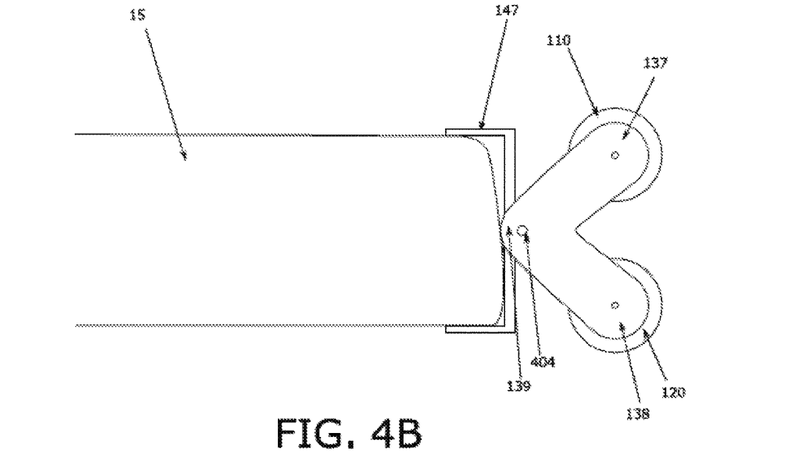
FIG. 4B is a side perspective view of the loading apparatus of FIG. 4A, according to an embodiment of the present disclosure.

FIG. 4B shows a side perspective view of the loading apparatus 100 of FIG. 4A, attached to the vehicle 10 according to an embodiment of the present disclosure. Shown here is the first arm support 130 and the first clamp 145 connected to the vehicle 10. The first arm support 130 may be connected to the support bar 202 with a first swivel connector 402 and the second arm support 136 may be connected to the support bar 202 with a second swivel connector 404. In one embodiment, the first arm support 130 and the second arm support 136 may be composed from a metal material. In addition, the first arm support 130 and the second arm support 136 may be configured to support the weight of at least 50 lb.

Similarly, the first clamp 145 and the second clamp 147 may be configured to support the weight of at least 50 lb, and may be composed from the metal material. Further, the first clamp 145 and second clamp 147 may be extendable, respectively, and configured to clamp onto a variety of differently sized vehicles.

According to one embodiment, the loading apparatus 100 may be arranged as a kit. The kit may include a set of instructions. The instructions may detail functional relationships in relation to the structure of the loading apparatus 100 (such that the loading apparatus 100 can be used, maintained, or the like, in a preferred manner).

Figure 5:
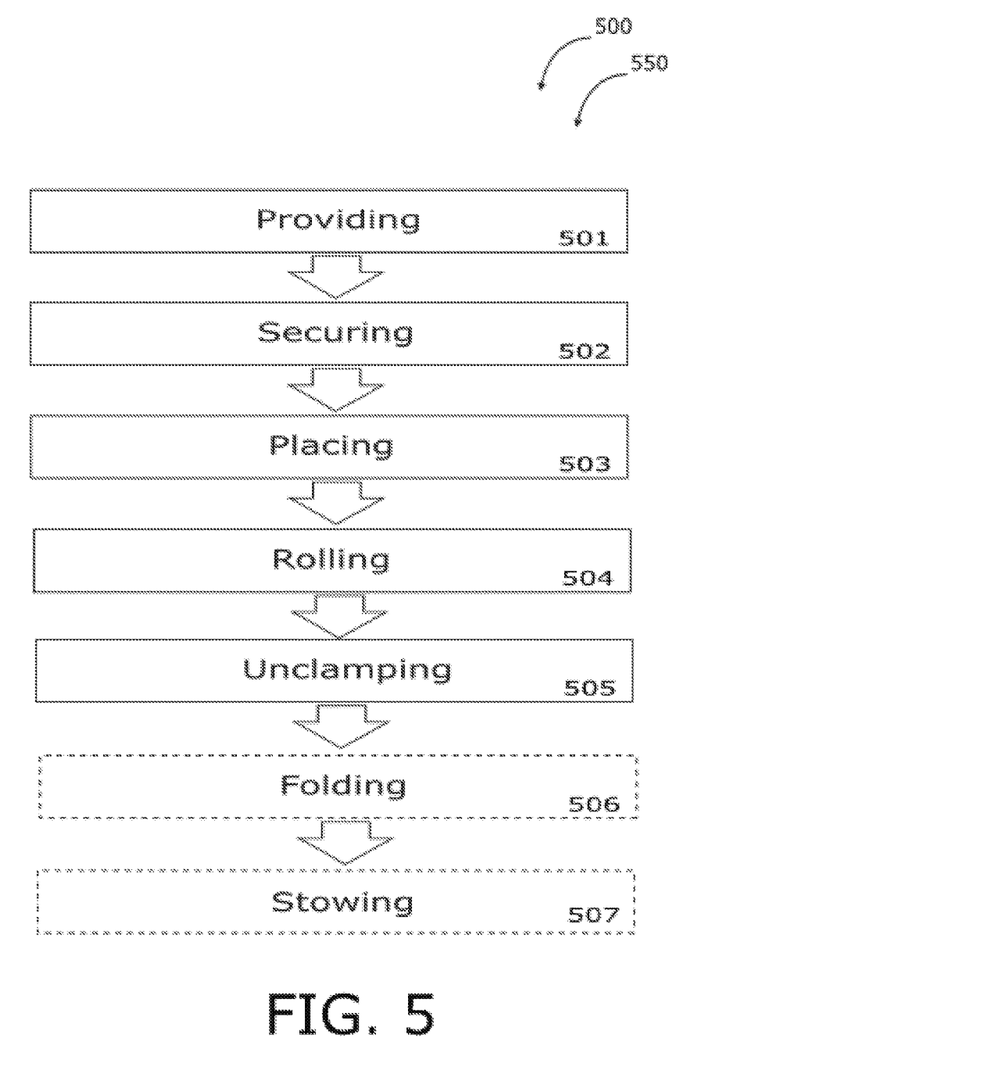
FIG. 5 is a flow diagram illustrating a method of use for the loading apparatus, according to an embodiment of the present disclosure.

FIG. 5 is a flow diagram 550 illustrating a method of using 500 a loading apparatus for a vehicle 100, (the vehicle 10 including a rear threshold 15 and a rear loading portion 20) according to an embodiment of the present disclosure. As illustrated, the method of using 500 a loading apparatus for a vehicle 100 may include the steps of: step one 501, providing the loading apparatus 10 (the loading apparatus 100 including a first roller 110, a second roller 120, a first arm support 130, a second arm support 136, a support bar 202, a first clamp 145 and a second clamp 147); step two 502, securing the first clamp 145 and the second clamp 147 to the rear threshold 15 of the vehicle 10; step three 503, placing a load onto the first roller 110 and the second roller 120; step four 504, rolling the load over the first roller 110 and the second roller 120 and into the rear loading portion 20 of the vehicle 10; and step five 505, unclamping the first clamp 145 and the second clamp 147 from the rear threshold 15 of the vehicle 10. Further steps may include: step six 506, folding the loading apparatus 5 into a compact state; and step seven 507, stowing the loading apparatus 100 in the rear loading portion 20 of the vehicle 10 when not in use.

It should be noted that step six 506 and step seven 507 are optional steps and may not be implemented in all cases. Optional steps of method of use 500 are illustrated using dotted lines in FIG. 5 so as to distinguish them from the other steps of method of use 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for use of the loading apparatus 100 (e.g., different step orders within above-mentioned list, elimination or addition of certain steps, including or excluding certain maintenance steps, etc.), are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A loading apparatus for a vehicle, the vehicle including a rear threshold and a rear loading portion, the loading apparatus comprising:

a first roller including a first distal end and a first proximal end, the first roller configured to receive a load and roll the load into the rear loading portion of the vehicle;

a second roller including a second distal end and a second proximal end, the second roller configured to receive the load and roll the load into the rear loading portion of the vehicle;

a first arm support having a first left corner, a first right corner and a first bottom corner located between the first left corner and first right corner, the first left corner being fixedly attached to the first distal end of the first roller, the first right corner being fixedly attached to the second distal end of the second roller, the first arm support being configured to swivel on an axis;

a second arm support having a second left corner, a second right corner and a second bottom corner located between the second left corner and second right corner, the second left corner being fixedly attached to the first proximal end of the first roller, the second right corner being fixedly attached to the second proximal end of the second roller, the second arm support being configured to swivel on the axis;

a support bar including the axis, a first end and a second end, the first end being fixedly attached to the first bottom corner of the first arm support, the second end being fixedly attached to the second bottom corner of the second arm support;

a first clamp fixedly attached to the first bottom corner of the first arm support, the first clamp being configured to removably lock onto the rear threshold of the vehicle; and a second clamp fixedly attached to the second bottom corner of the second arm support, the second clamp being configured to removably lock onto the rear threshold of the vehicle; and wherein the first roller and the second roller are configured in combination to provide a means to roll-load the load into the vehicle with a minimum effort.

2. The loading apparatus of claim 1, wherein the first arm support is connected to the support bar with a first swivel connector, and the second arm support is connected to the support bar with a second swivel connector.

3. The loading apparatus of claim 1, wherein the loading apparatus is foldable and configured for compact storage.

4. The loading apparatus of claim 1, wherein the vehicle is a pickup truck and the rear threshold is a tailgate.

5. The loading apparatus of claim 1, wherein the loading apparatus further includes a winch configured to pull heavy loads into the rear loading portion of the vehicle.

6. The loading apparatus of claim 1, wherein the first roller and the second roller are configured to receive and roll a weight of at least 50 lb.

7. The loading apparatus of claim 1, wherein the first clamp and the second clamp are configured to support the weight of at least 50 lb.

8. The loading apparatus of claim 1, wherein the first arm support and the second arm support are configured to support the weight of at least 50 lb.

9. The loading apparatus of claim 1, wherein the first roller and the second roller are composed of a metal material.

10. The loading apparatus of claim 1, wherein the first roller and the second roller are composed of a plastic material.

11. The loading apparatus of claim 1, wherein the first roller and the second roller are composed of a rubber material.

12. The loading apparatus of claim 1, wherein the first roller and the second roller include a first smooth surface and a second smooth surface, respectively, configured to prevent friction between the load and the first roller and the second roller when the load is being loaded into the rear loading portion of the vehicle.

13. The loading apparatus of claim 1, wherein the first arm support and the second arm support are composed of a metal material.

14. The loading apparatus of claim 1, wherein the first clamp and the second clamp are composed of a metal material.

15. The loading apparatus of claim 14, wherein the metal material is steel.

16. The loading apparatus of claim 1, wherein the first clamp and second clamp are extendable, respectively, and configured to clamp onto a variety of differently sized vehicles.

17. A loading apparatus for a vehicle, the vehicle including a rear threshold and a rear loading portion, the loading apparatus comprising:

a first roller including a first distal end and a first proximal end, the first roller configured to receive a load and roll the load into the rear loading portion of the vehicle;

a second roller including a second distal end and a second proximal end, the second roller configured to receive the load and roll the load into the rear loading portion of the vehicle;

a first arm support having a first left corner, a first right corner and a first bottom corner located between the first left corner and first right corner, the first left corner being fixedly attached to the first distal end of the first roller, the first right corner being fixedly attached to the second distal end of the second roller, the first arm support being configured to swivel on an axis;

a second arm support having a second left corner, a second right corner and a second bottom corner located between the first left corner and first right corner, the second left corner being fixedly attached to the first proximal end of the first roller, the second right corner being fixedly attached to the second proximal end of the second roller, the first second arm support being configured to swivel on the axis;

a support bar including the axis, a first end and a second end, the first end being fixedly attached to the first bottom corner of the first arm support, the second end being fixedly attached to the second bottom corner of the second arm support;

a first clamp fixedly attached to the first bottom corner of the first arm support, the first clamp being configured to removably lock onto the rear threshold of the vehicle; and a second clamp fixedly attached to the second bottom corner of the second arm support, the second clamp being configured to removably lock onto the rear threshold of the vehicle; and wherein the first roller and the second roller are configured in combination to provide a means to roll-load the load into the vehicle with a minimum effort;

wherein the first arm support is connected to the support bar with a first swivel connector and the second arm support is connected to the support bar with a second swivel connector;

wherein the loading apparatus is foldable and configured for compact storage;

wherein the vehicle is a pickup truck and the rear threshold is a tailgate;

wherein the loading apparatus further includes a winch configured to pull heavy loads into the rear loading portion of the vehicle;

wherein the first roller and the second roller are configured to receive and roll a weight of at least 50 lb;

wherein the first clamp and the second clamp are configured to support the weight of at least 50 lb;

wherein the first arm support and the second arm support are configured to support the weight of at least 50 lb;

wherein the first roller and the second roller are composed of a rubber material;

wherein the first roller and the second roller include a first smooth surface and a second smooth surface, respectively, configured to prevent friction between the load and the first roller and the second roller when the load is being loaded into the rear loading portion of the vehicle;

wherein the first arm support and the second arm support are composed of a metal material;

wherein the first clamp and the second clamp are composed of a metal material; and wherein the first clamp and second clamp are extendable, respectively, and configured to clamp onto a variety of differently sized vehicles.

18. The loading apparatus of claim 17, further comprising set of instructions; and wherein the loading apparatus is arranged as a kit.

19. A method of using a loading apparatus for a vehicle, the vehicle including a rear threshold and a rear loading portion, the method comprising the steps of:

providing the loading apparatus, the loading apparatus including a first roller, a second roller, a first arm support, a second arm support, a support bar, a first clamp and a second clamp;

securing the first clamp and the second clamp to the rear threshold of the vehicle;

placing a load onto the first roller and the second roller;

rolling the load over the first roller and the second roller and into the rear loading portion of the vehicle; and unclamping the first clamp and the second clamp from the rear threshold of the vehicle.

20. The method of claim 19, further comprising the steps of:

folding the loading apparatus into a compact state; and stowing the loading apparatus in the rear loading portion of the vehicle when not in use.

* * * * *